US012644520B2

(12) United States Patent
Downie et al.

(10) Patent No.: US 12,644,520 B2
(45) Date of Patent: Jun. 2, 2026

(54) SEALING ELEMENT AND ASSEMBLY

(71) Applicant: SEELYNN TOOLWORKS INC., High River (CA)

(72) Inventors: Ronald James Downie, High River (CA); Joel Victor-David Dunbar, Coleman (CA)

(73) Assignee: Seelynn Toolworks Inc., High River (CA)

(*) Notice: Subject to any disclaimer, the term of this patent is extended or adjusted under 35 U.S.C. 154(b) by 81 days.

(21) Appl. No.: 18/809,555

(22) Filed: Aug. 20, 2024

(65) Prior Publication Data

US 2024/0410466 A1     Dec. 12, 2024

Related U.S. Application Data

(62) Division of application No. 17/759,668, filed as application No. PCT/CA2021/050084 on Jan. 28, 2021, now Pat. No. 12,092,217.

(60) Provisional application No. 62/991,706, filed on Mar. 19, 2020, provisional application No. 62/966,911, filed on Jan. 28, 2020.

(51) Int. Cl.
*F16J 15/3204*     (2016.01)
*F16J 15/328*     (2016.01)

(52) U.S. Cl.
CPC ......... *F16J 15/3204* (2013.01); *F16J 15/328* (2013.01)

(58) Field of Classification Search
CPC .............. B29C 45/14; B29C 2045/135; B29C 45/0053; B29C 39/405; B29C 39/206;
B29C 39/203; B29C 39/20; B29C 39/18; B29C 39/123; B29C 39/12; B29C 39/10; B29C 39/025; B29C 39/021
See application file for complete search history.

(56) References Cited

U.S. PATENT DOCUMENTS

| | | | |
|---|---|---|---|
| 4,480,843 A | 11/1984 | Springer | |
| 4,664,461 A * | 5/1987 | Schubert | B29C 45/14 439/271 |
| 5,901,964 A | 5/1999 | Williams et al. | |
| 6,129,152 A | 10/2000 | Hosie et al. | |

(Continued)

FOREIGN PATENT DOCUMENTS

WO     2013102131 A2     7/2013

OTHER PUBLICATIONS

International Search Report and Written Opinion based on PCT/CA2021/050084 dated Apr. 6, 2021 and mailed on Apr. 29, 2021, 3 pp.

*Primary Examiner* — Stella K Yi
(74) *Attorney, Agent, or Firm* — Heslin Rothenberg Farley and Mesiti P.C.; Victor A. Cardona, Esq.

(57) ABSTRACT

A sealing element for a rotating control device is described. The sealing element includes an elastomeric body having a central bore for sealing against a pipe passing therethrough. The elastomeric body has an upper portion which is internally reinforced with a frame and a lower portion formed with a plurality of protrusions. The radial protrusions provide columnar support to the lower portion permitting the lower portion to resist centrifugal and frictional forces against the lower portion during drilling and other operations. The sealing element may be used to form an assembly with reusable parts for connecting the sealing element to a mandrel of a rotating control device.

19 Claims, 15 Drawing Sheets

(56)         References Cited

U.S. PATENT DOCUMENTS

| | | |
|---|---|---|
| 6,910,531 B2 | 6/2005 | Smith, Jr. |
| 7,174,956 B2 | 2/2007 | Williams |
| 7,237,618 B2 | 7/2007 | Williams |
| 7,240,727 B2 | 7/2007 | Williams |
| 8,596,345 B2 | 12/2013 | Li et al. |
| 9,546,734 B2 | 1/2017 | Cid et al. |
| 9,863,203 B2 | 1/2018 | Borden et al. |
| 2003/0010213 A1 | 1/2003 | Gerner et al. |
| 2009/0008870 A1* | 1/2009 | Chagnon ................ B65H 29/68 |
| | | 271/229 |
| 2009/0025573 A1 | 1/2009 | Thompson |
| 2009/0255734 A1* | 10/2009 | Williams ............. E21B 33/085 |
| | | 264/255 |
| 2011/0031540 A1 | 2/2011 | Hara |
| 2012/0008554 A1 | 1/2012 | Kim et al. |
| 2012/0085545 A1 | 4/2012 | Tarique et al. |
| 2012/0261888 A1 | 10/2012 | Borden |
| 2015/0308216 A1* | 10/2015 | Wiggins ................. B29C 45/72 |
| | | 166/179 |
| 2017/0138477 A1 | 5/2017 | Cutler et al. |

* cited by examiner

BORE
9

7

5

6

MANDREL
8

5

ADAPTER
7

6

4

RCD
BEARING
ASSEMBLY
3

ELEMENT
RING
5

ADAPTER
7

SEALING
PORTION
6

4

SEALING
ELEMENT
4

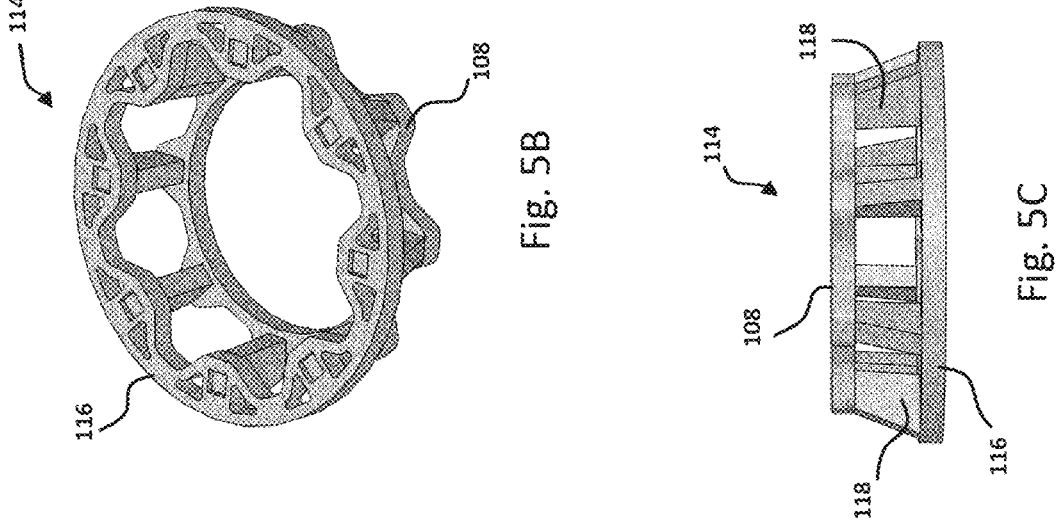
Fig. 5B
Fig. 5C
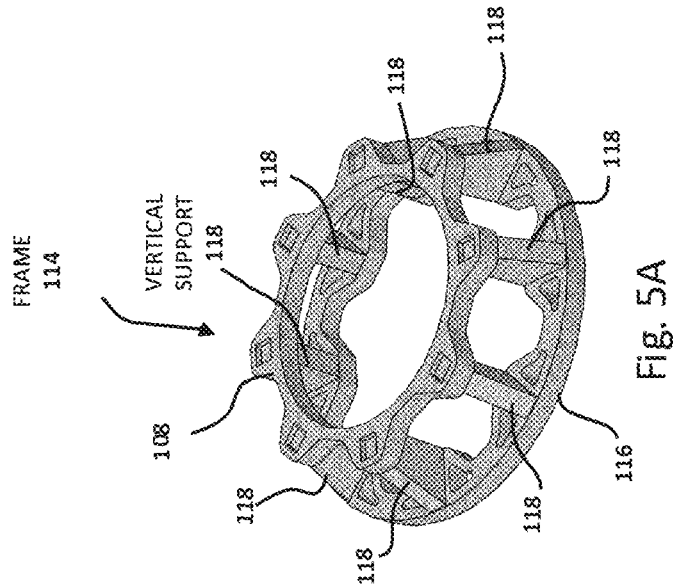
FRAME 114
VERTICAL SUPPORT 118
Fig. 5A

214

218

218

218

216

218

218

214

208

218

216

FRAME
214

208

VERTICAL
SUPPORT
218

218

218

218

218

216

218

SEALING
ELEMENT
200

UPPER
PORTION
202

FRAME
214

LOWER
PORTION
202

314

316

318

318

318

318

314
318

318

318

316

316

FRAME
314

VERTICAL
SUPPORT
318

318 318

318

318

318

316

SEALING
ELEMENT
300

UPPER
PORTION
302

FRAME
314

LOWER
PORTION
302

FRAME
714

CUT-OUTS
715

715

715

SEALING
ELEMENT
700

UPPER
PORTION
702

720

720

714

710

710

710

710

BORE
706

LOWER
PORTION
704

PROTRUSION
710

SEALING ELEMENT AND ASSEMBLY

CROSS-REFERENCE TO RELATED APPLICATIONS

This application is a divisional of U.S. patent application Ser. No. 17/759,668 filed on Jul. 28, 2022, which is a 371 National Stage of International application no. PCT/CA2021/050084 filed on Jan. 28, 2021, and which claims priority to U.S. Provisional Patent Application Ser. No. 62/966,911 filed on Jan. 28, 2020, and U.S. Provisional Patent Application Ser. No. 62/991,706 filed on Mar. 19, 2020. The entire disclosures of the indicated applications are incorporated herein by reference.

FIELD

The technology described herein relates to wellhead components used in drilling of oil and gas wells and more particularly to sealing elements used to isolate the upper wellhead components from wellhead pressure.

BACKGROUND

During oilfield drilling operations, the control of pressures and flows to and from and within the well bore are critical to maintaining a safe drilling environment particularly around the drilling platform and wellhead. Two critical devices operating on a wellhead during drilling are the blowout preventer (BOP) stack and a rotating control device (RCD). Both of these devices control pressures and flows to and from the well during drilling and particularly during events such as well kicks and loss of circulation of drilling fluids and gases.

The rotating control device provides a sealed connection between the fixed non-rotating BOP stack and any rotating components above or passing through the BOP stack. Generally, the RCD also functions to provide safe fluid containment and diversion of returning drilling fluids and cuttings away from the drill floor during drilling.

The RCD includes a non-rotating main body which connects to the BOP stack or an upper extension thereof and a bearing assembly which includes a rotating portion that passes through the main body and grips the drill string with an elastomeric sealing element.

The elastomeric sealing element must be flexible enough to allow pipe joints to pass through the RCD while maintaining a seal around the drill pipe. Elastomeric sealing elements also are used in other applications such as managed pressure drilling or underbalanced drilling. Conventionally, elastomeric seals such as natural rubber, nitriles or polyurethane seals are used, which provide the needed flexibility. Polyurethane tends to be the most commonly employed elastomeric material used in construction of elastomeric sealing elements.

Sealing elements designed and constructed for use with rotating control devices and other similar devices are described in U.S. Pat. Nos. 9,863,203 8,596,345, 7,240,727, 7,237,618, 7,174,956, 6,910,531, 6,129,152, and 5,901,964, and U.S. Patent Publication Nos. 20090255734, 20030102136, 20110315404, 20120085545, and 20150308216, each of which is incorporated herein by reference in its entirety.

There continues to be a need for improvements in sealing elements for rotating control devices.

SUMMARY

According to one embodiment, there is provided a sealing element for use with a rotating control device. The sealing element comprises an elastomeric body having a central bore for sealing against a pipe passing therethrough. The elastomeric body has an upper portion which is reinforced by a frame and a lower portion formed with a plurality of outer protrusions providing columnar support to the lower portion against forces exerted against the lower portion by a drill string passing through the central bore.

The elastomeric body may be a monolithic body formed by casting or injecting an elastomer material over the frame.

The upper portion may be substantially cylindrical.

The frame may include at least one ring circumscribing the central bore.

In some embodiments, the lower portion does not include any internal members.

The lower portion may be generally frustoconical or generally cylindrical with the protrusions generating a pleated outer sidewall. The plurality of outer protrusions may be 8 equi-spaced protrusions.

The sealing element may be provided with a coupling structure for connecting the sealing element to a rotating control device. The coupling structure may be provided by threads in a sidewall of the central bore of the upper portion or by an outer lip or groove configured to couple to a separate clamp which also clamps directly or indirectly to a component of the rotating control device.

The upper portion may have a height between about 8% to about 45% of the height of the sealing element. In some embodiments, the upper portion has a height between about 8% to about 12% of the height of the sealing element. In other embodiments, the upper portion has a height between about 35% to about 45% of the height of the sealing element.

A sidewall of the central bore may include a plurality of flutes arranged radially to relieve radial pressure of the sealing element against the pipe when the pipe is moved upwardly through the central bore.

According to another embodiment, there is provided a process for manufacturing a sealing element for use with a rotating control device. The process includes providing a three-dimensional mold pattern of the sealing element, the mold pattern defined by a shaped outer pattern sidewall; casting or injecting a first elastomer over the three-dimensional pattern and curing the first elastomer to produce a mold body having a shaped inner mold sidewall complementary to the shaped outer pattern sidewall; placing a frame and a core inside the mold body, the frame held in place by the shaped inner mold sidewall and the core provided with a shaped outer core sidewall; casting or injecting a second elastomer into the mold body and curing the second elastomer to produce the sealing element, wherein the sealing element is defined by a shaped outer sealing element sidewall complementary to the shaped inner mold sidewall and a central bore defined by a shaped inner sealing element sidewall complementary to the shaped outer core sidewall.

In some embodiments, the mold pattern is produced by additive manufacturing.

The mold pattern may be assembled from two or more three-dimensional pattern parts.

In some embodiments of the process, the frame comprises at least one ring circumscribing the central bore and a plurality of members extending vertically from the ring. The frame may be formed of a metal or alloy.

In some embodiments, the frame is formed of parts cut from a single piece of sheet metal or alloy.

The shaped outer sealing element sidewall may include a plurality of outer protrusions providing columnar support to a lower portion of the sealing element against forces exerted against the lower portion by a drill string passing through the central bore.

The shaped inner sealing element sidewall may be provided with a coupling structure for connecting the sealing element to a rotating control device. In some embodiments, the coupling structure in the shaped inner sealing element sidewall is provided by threads.

The shaped outer sealing element sidewall may be provided with an outer lip or groove configured to couple to a separate clamp which also clamps directly or indirectly to a component of the rotating control device.

In some embodiments, the shaped inner sealing element sidewall includes a plurality of flutes.

In some embodiments, the mold pattern is not constructed by machining.

According to another embodiment, there is provided a sealing element assembly for use with a rotating control device. The assembly includes: a sealing element as described herein, an outer housing configured to fit over the upper portion of the sealing element and including a first coupling structure; an adapter configured for connection to a mandrel of the rotating control device, the adapter configured to fit within the central bore of the sealing element and including a second coupling structure configured to contact the first coupling structure of the outer housing; and a retaining component configured to hold the first coupling structure and the second coupling structure in contact with each other.

The first coupling structure may be provided by an outer circumferential lip on the outer housing and the second coupling structure may be provided by an outer circumferential ridge on the adapter.

The retaining component may be formed of a pair of retention ring halves reversibly connectable by fasteners.

The housing may include a slot below the circumferential lip to receive a rail formed in an inner sidewall of each of the retention ring halves.

The circumferential ridge may have a tapered surface to facilitate insertion of the rail into the slot.

According to another embodiment, there is provided a sealing element assembly for use with a rotating control device. The assembly includes: a sealing element as described herein, an adapter configured for connection to a mandrel of the rotating control device, the adapter configured to be supported by a top surface of the upper portion of the sealing element; and a retaining component configured to hold the adapter in contact with the top surface of the upper portion of the sealing element.

The retaining component may be formed of a pair of retention ring halves reversibly connectable by fasteners.

The adapter may include a circumferential lip with and the pair of retention ring halves forms a circumferential groove which retains the circumferential lip against the top surface upper portion of the sealing element.

BRIEF DESCRIPTION OF THE DRAWINGS

Various objects, features and advantages will be apparent from the following description of particular embodiments illustrated in the accompanying drawings. The drawings are not necessarily to scale in all cases. Emphasis is placed upon illustrating the principles of various embodiments. Similar reference numerals indicate similar components or components providing similar functionality.

FIG. 5A is a top perspective view of the frame 114 of the sealing element 100.

FIG. 5B is a bottom perspective view of the frame 114 of the sealing element 100.

FIG. 5C is a side elevation view of the frame 114 of the sealing element 100.

DETAILED DESCRIPTION

Introduction and Rationale

Figure 1:
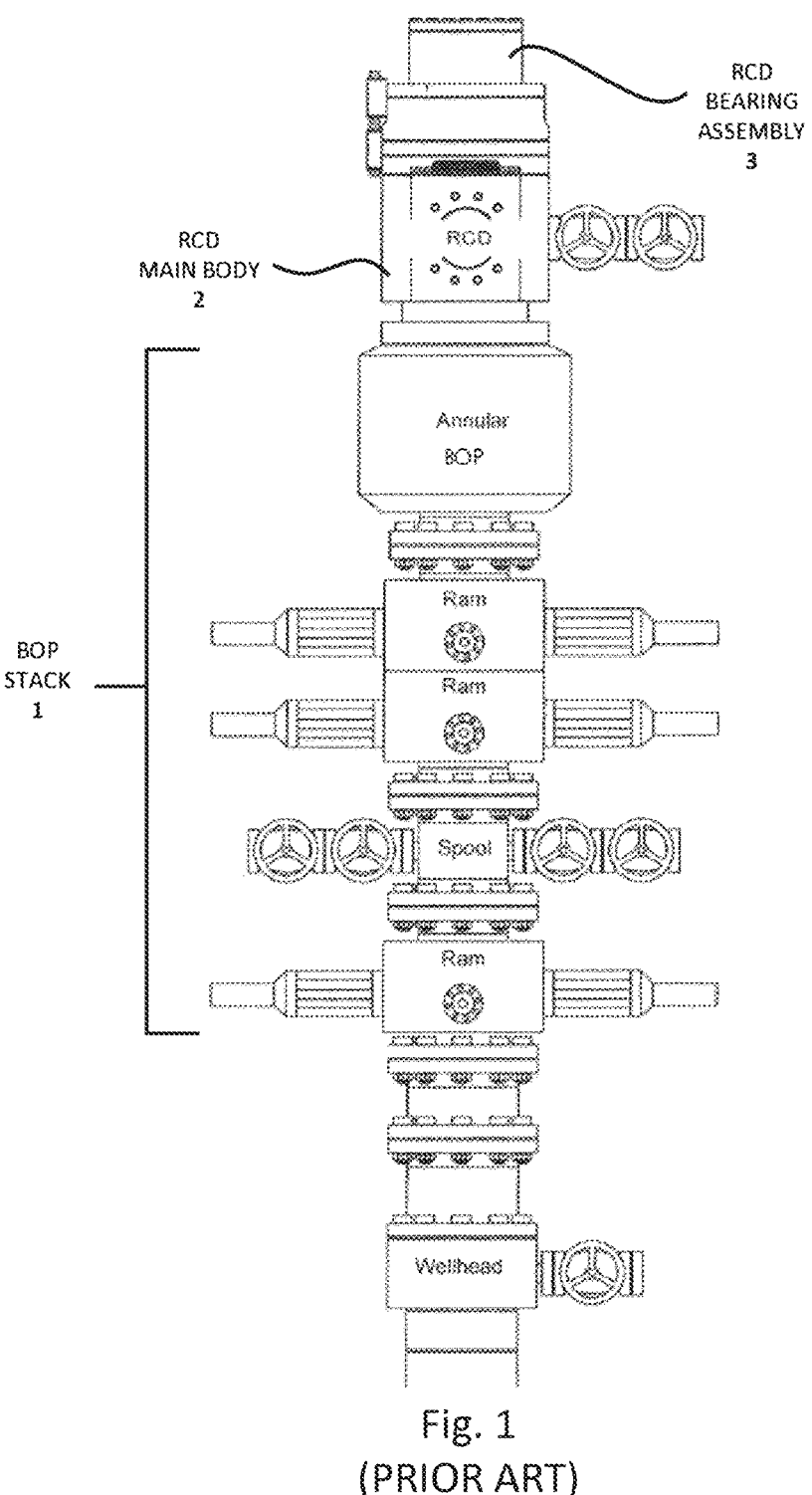
FIG. 1 is a side elevation view showing an example of an arrangement of a BOP stack 1 with a rotating control device (RCD) attached thereto and showing the RCD main body 2 and the RCD bearing assembly 3.
Figures 2A, 2B, 2C:
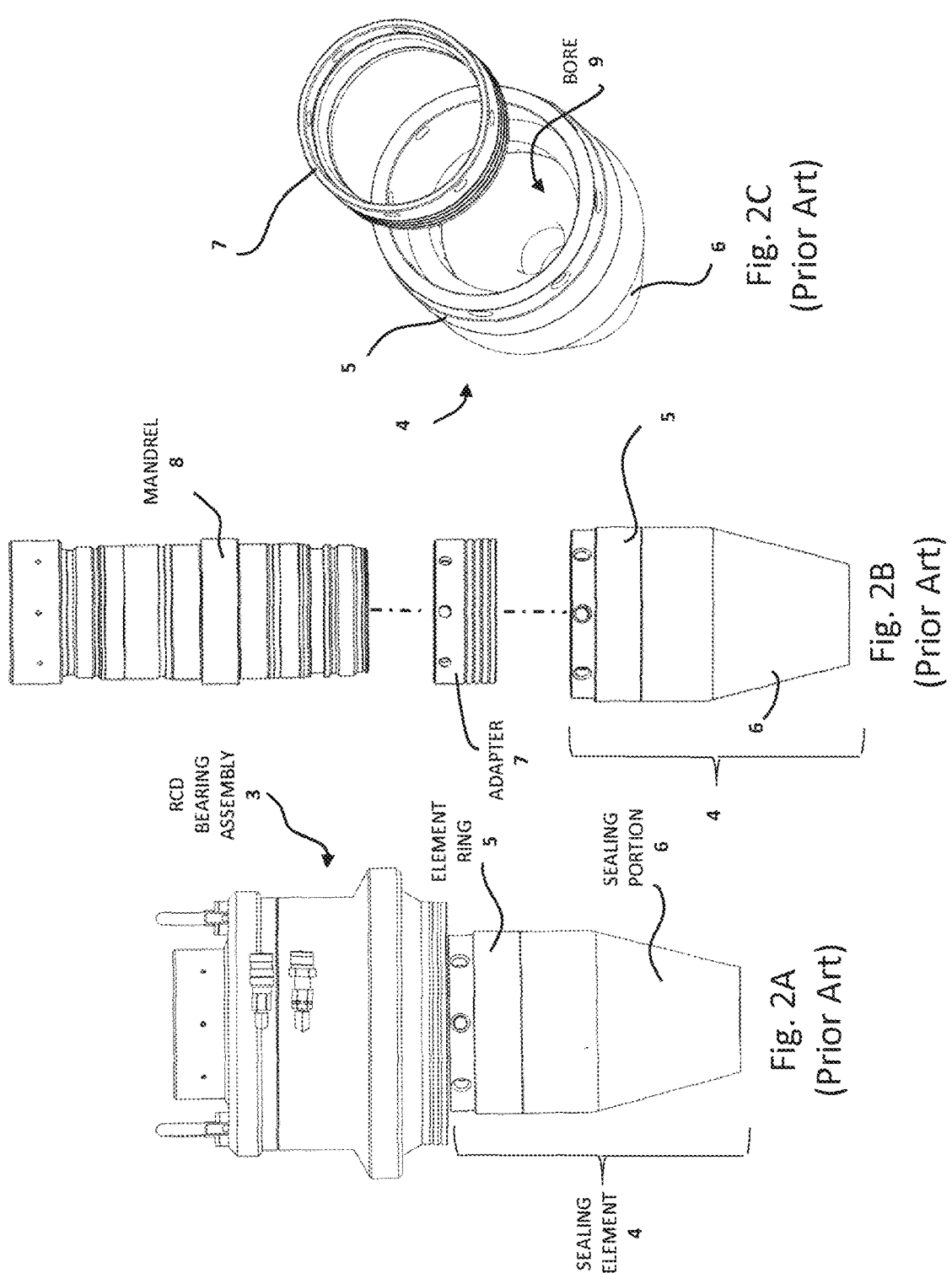
FIG. 2A is a side elevation view of a conventional arrangement of a sealing element 4 connected to an RCD bearing assembly 3.
FIG. 2B is an exploded view showing selected components of the arrangement of FIG. 2A.
FIG. 2C is a top perspective view of sealing element 4 and adapter 7 of the arrangement of FIGS. 2A and 2B.

By way of introduction of a typical operating environment of the sealing element embodiments described herein, FIG. 1 shows a conventional arrangement of an RCD assembly with an RCD bearing assembly 3 in association with an RCD main body 2 located above a BOP stack 1. FIG. 2A shows a conventional arrangement of a sealing element 4 associated with an RCD assembly 3. It is seen that the sealing element 4 is formed of a rigid element ring 5 connected to a sealing portion 6. The element ring 5 is typically a machined metallic portion formed from an alloy such as stainless steel and the sealing portion 6 is an elastomeric portion which forms a seal against a drill pipe or other tubular component passing though the RCD bearing assembly 3. The sealing portion 6 is typically attached to projecting fingers (not shown) which extend from the element ring 5 such that the projecting fingers are contained inside the sealing portion 6.

FIG. 2B indicates that the element ring 5 connects to an adapter 7 which is used to make a connection to the mandrel 8 of the RCD bearing assembly 3. FIG. 2C is a top perspective view of the sealing element 4 and adapter 7 showing the central bore 9 of the sealing element as well as the adapter 7 above the sealing element 4. In this conventional arrangement, the adapter 7 is provided with o-rings (not shown) to seal the adapter 7 to the mandrel 8 of the RCD bearing assembly 3.

When a conventional sealing element such as the sealing element 4 of FIGS. 2A-C becomes damaged through the course of normal operation, for example by cracks forming in the sealing portion 6, it is compromised in its sealing function and must be replaced. At this stage, the damaged sealing element 4 is usually shipped back to its manufacturer where the damaged elastomeric sealing portion 6 is removed and discarded and the element ring 5 is recovered. A new sealing portion 6 is then installed on the element ring 5 to provide a refurbished sealing element 4. Methods for removing the damaged sealing portion 6 from the element ring 5 are themselves expensive to implement. Examples of such methods include freezing the elastomeric sealing portion 6 with dry ice or liquid nitrogen followed by shattering the elastomeric sealing portion 6 and removing the shards from the element ring 5. Although, the entire refurbishing process is expensive and inefficient, it has continued to be used because the element ring 5 is expensive to manufacture, which provides a disincentive to discard or recycle it. The inventors have recognized that this process itself is expensive and inefficient, primarily due to the expenses associated with shipping damaged sealing elements back to the manufacturers. As a result, the inventors have addressed the costs and inefficiencies associated with this process by construction of an inventive sealing element described herein which has a number of additional advantages and enhanced sealing properties and which may be inexpensively manufactured and cost-effectively discarded or recycled.

Figure 3B:
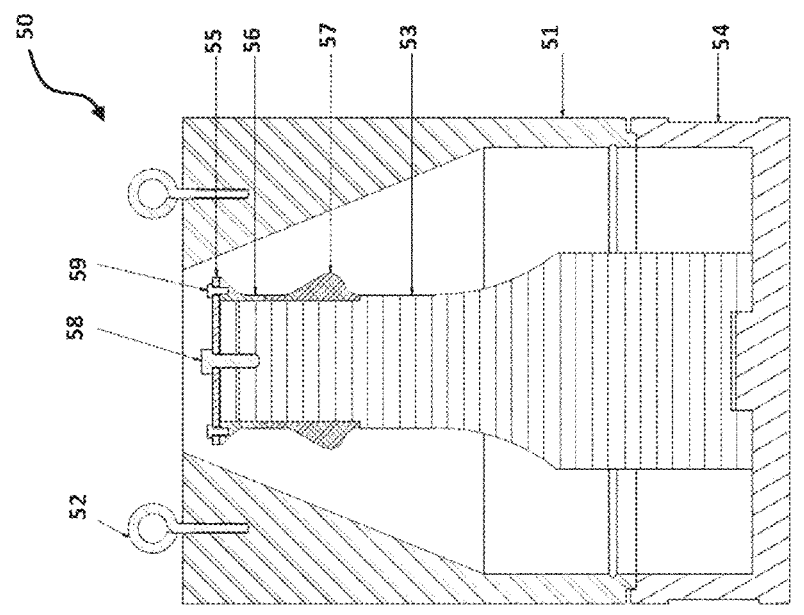
FIG. 3B is an arbitrary cross section of the conventional mold assembly 50 of FIG. 3A.
Figure 3A:
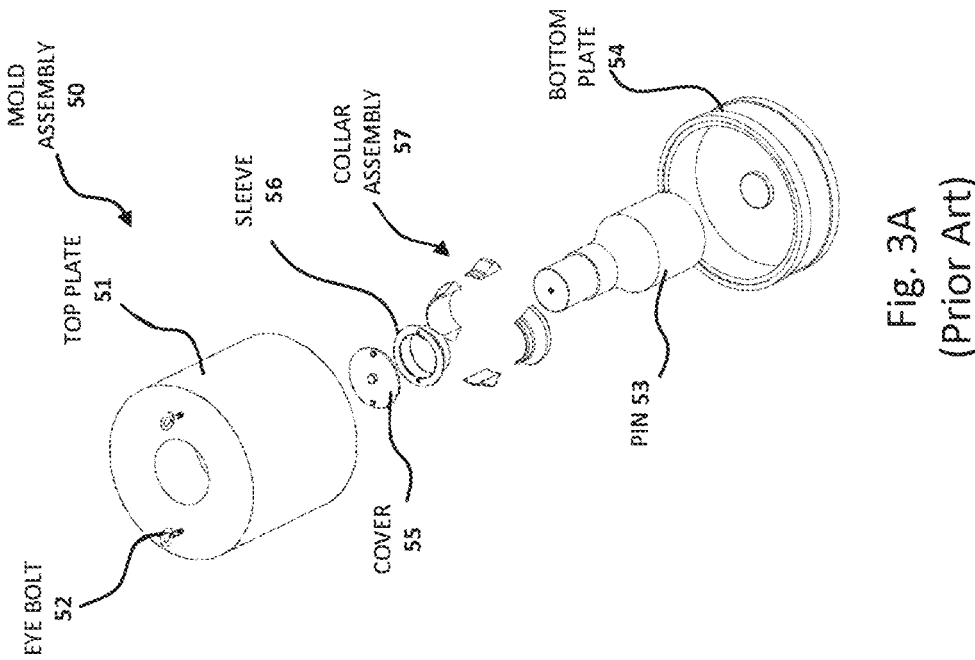
FIG. 3A is an exploded view showing the components used in a conventional mold assembly 50 for constructing the elastomeric sealing portion of a conventional sealing element such as sealing element 4 of FIGS. 2A-C.

An efficient process for manufacturing various embodiments of the sealing element is also described herein. This process was developed when the inventors recognized that the costs associated with construction of molds used to manufacture sealing elements are prohibitive with respect to optimization of new sealing elements having different shapes to provide a balance between flexibility and resistance to stresses and damage. Conventional mold assemblies for constructing elastomeric sealing elements are machined from metals such as aluminum. One example of such a conventional mold assembly 50 for constructing a conventional sealing portion 6 is shown in FIGS. 3A and 3B. This mold assembly 50 includes several machined parts including a top plate 51 having eye bolts 52 connected to an upper surface of the top plate 51, a pin 53 configured for connection to a bottom plate 54 and a cover 55, sleeve 56 and collar assembly 57 each configured for connection to an upper portion of the pin 53. The cover 55 is connected to the top of the pin 53 by bolts 58, 59. The cross section of the mold assembly 50 shown in FIG. 3B shows an internal cavity defined by the inner sidewalls of the top plate 51, inner sidewalls and floor of the bottom plate and the outer sidewall of the pin 53 and its associate components 55, 56 and 57. The elastomeric sealing portion 6 is formed by casting or injecting an elastomeric material into the cavity of the mold assembly 50 and curing the elastomeric material. Then the top plate 51 is disengaged from the bottom plate 52 to remove the cured sealing portion 6 from the mold assembly 50.

Provision of mold assemblies having additional shapes in the inventive embodiments of sealing elements described herein was viewed as being likely to significantly increase the costs of manufacturing the sealing elements because machining of such mold assemblies from metals such as aluminum is time consuming and expensive (as used herein, the term "machining" refers to any process where a piece of raw material is cut into a desired final shape and size by a controlled material removal process). The inventors then recognized that additive manufacturing methods (also known as 3D printing) could be used to prepare an initial three dimensional pattern from which a mold assembly could be prepared and then used to construct the elastomeric sealing element. In this inventive process, a computer model of a sealing element with the desired features is constructed using a computer assisted design (CAD) software and then a benchtop scale 3D-printer is used to construct a portion (such as a third or a quarter, for example) of a sealing element pattern. Constructing the pattern in portions allows smaller 3D-printers to be used, thereby reducing costs further. When all portions of the 3D pattern are constructed, they are attached to each other using an adhesive to create the complete 3D pattern. A mold assembly is then obtained by casting or injecting an elastomeric material against the 3D pattern and curing the elastomeric material. When cured, the elastomeric material provides the main body of a mold assembly which can be used to produce the structure of the desired sealing element which matches the 3D pattern. This process enables cost-effective production of molds for prototyping of different sealing elements which would have been cost-prohibitive due to the expense of machining conventional molds. One embodiment of this process will be described in detail hereinbelow with respect to FIG. 11. It is roughly estimated that this manufacturing process will reduce the costs of manufacturing of sealing elements by at least about 10-fold with significant cost savings realized during prototyping processes which may include design and testing of many different embodiments for specialized applications. The cost savings are realized primarily by avoidance of detailed machining of mold assemblies by using 3D-printing of 3D patterns of computer-based models of sealing elements as the basis for generating the mold assemblies.

Various embodiments will now be described with reference to FIGS. 4 to 17. Emphasis is placed on highlighting the various contributions of the components to the functionality of various aspects of these embodiments. A number of possible alternative features are introduced during the course of this description. It is to be understood that, according to the knowledge and judgment of persons skilled in the art, such alternative features may be substituted in various combinations to arrive at different embodiments which are within the scope of the claims. Similar reference numerals are used to indicate similar components in different embodiments, wherever possible, as will be recognized from context.

Functional Components of Sealing Element Embodiments

Figures 4A, 4B, 4C, 4D:
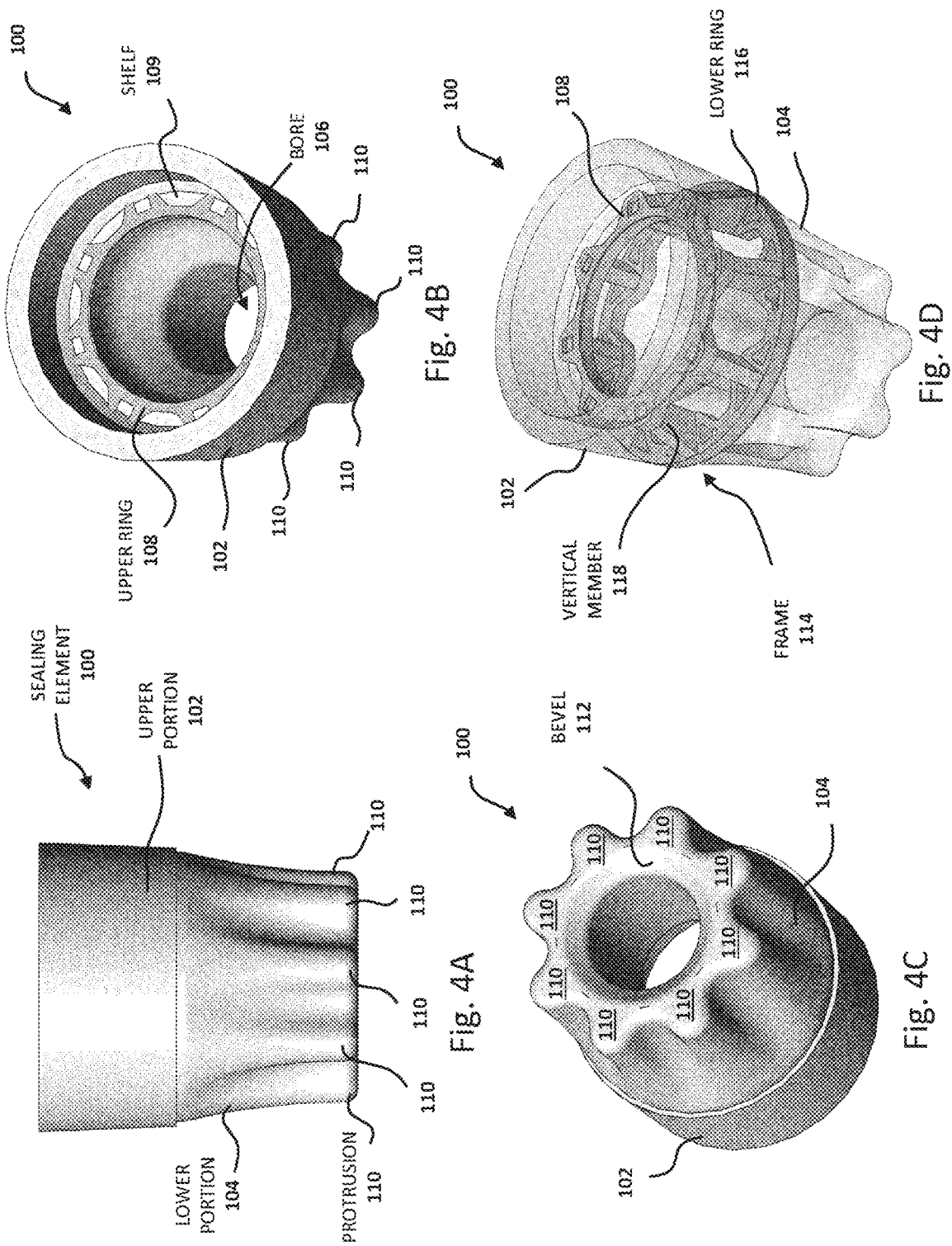
FIG. 4A is a side elevation view of a first embodiment of a sealing element 100.
FIG. 4B is a top perspective view of the sealing element 100 of FIG. 4A.
FIG. 4C is a bottom perspective view of the sealing element 100 of FIGS. 4A and 4B.
FIG. 4D is a side perspective view of the sealing element 100 of FIGS. 4A to 4C showing its elastomeric body as transparent to visualize the reinforcing frame 114 inside the upper portion 102.

Turning now to FIGS. 4A to 4C, there is shown a first embodiment of a sealing element 100 which is formed of two components, an elastomeric body having an upper cylindrical portion 102 and a lower portion 104 which has a generally frustoconical profile with columnar protrusions 110 extending radially therefrom. As used herein, the terms "elastomer" and "elastomeric" refer to a material which has the property of elasticity. Elastomers typically have low Young's modulus and high yield strain. Elastomers may include saturated and unsaturated rubbers which may be natural or synthetic, such as thermoplastic elastomers. Thermoplastic elastomers may include styrenic block copolymers, polyolefins, polyurethanes, polyesters and polyamides. Polyurethanes, which are well suited as materials for constructing the elastomeric body, are characterized in terms of hardness using the Shore scale. In certain embodiments, the polyurethane used to construct the elastomeric body has Shore X hardness with a range of about 70 to about 100.

A bore 106 is formed in the elastomeric body. As best seen in FIG. 4B, the bore 106 has a cylindrical sidewall profile within the upper portion 102. The cylindrical profile transitions to a radial shelf 109 at the bottom of the upper portion 102. In an upper part of the lower portion 104, the bore 106 has a funnel shape which transitions to a reduced diameter cylindrical profile within the lower portion 104 of the elastomeric body.

It is best seen in FIG. 4C that there are 8 columnar radiused protrusions 110 extending from the lower portion 104, providing the lower portion 104 with a tapered and pleated outer diameter profile wherein the columnar radiused protrusions 110 are more pronounced at the bottom of the lower portion 104. The 8 protrusions 110 are provided to enhance the columnar support of the lower portion 104 against upward force exerted by removal of a drill string while simultaneously resisting tearing of the lower elastomeric portion 104 caused by movement of a drill string through the bore 106, and retaining the necessary flexibility to permit drill string joints to pass therethrough. The tapered and pleated profile of the outer sidewall of the lower portion 104 may be considered as providing the lower portion 104 with a reduced total volume of sealing elastomeric material relative to conventional sealing elements to enhance flexibility, while at the same time providing sufficient columnar support to resist damage caused by movement of a drill string through the bore 106.

While the present embodiment includes 8 circumferential radiused protrusions 110 in the lower portion 104 of the elastomeric body, it is to be understood that alternative embodiments may have more or fewer protrusions which may have different shapes such as columnar triangles or polygons, for example. Furthermore, the relative dimensions of the upper portion 102 and lower portion 104 of the elastomeric body and the bore formed therein may also be different in alternative embodiments.

The lower edge of the bore 106 is formed with an inner diameter bevel 112. The bevel 112 is provided to reduce the material strength of the elastomer against the drill string while retaining the sealing function of the elastomer at its bottom edge. This mitigates a common problem observed in conventional sealing elements where the lower edge of the sealing element is drawn upwards into the bore when a drill string is pulled upward through the bore, an issue which leads to damage of conventional sealing elements.

The top perspective view of FIG. 4B indicates that the lower boundary of the upper portion 102 terminates at the radial shelf 109. An upper ring 108 is embedded within the elastomeric body at this shelf 109. It is seen in FIG. 4D, where the entire elastomeric body is shown as transparent, that the upper ring 108 is part of an internal reinforcing frame 114 which also includes a lower ring 116 connected to the upper ring 108 by a series of vertical members 118. The upper ring 108 of the frame in this case has a smaller diameter than the lower ring 116 of the frame.

The frame 114 is shown in two perspective views in FIGS. 5A and 5B and in a side elevation view in FIG. 5C. Both the upper ring 108 and the lower ring 116 are provided with 8 lobes which, when aligned in the intended structure of the frame 114, provide sufficient upper and lower surface areas for installation of 8 vertical polygonal plate members 118 having a coupling structure 119 for cooperating with complementary coupling structures on the upper ring 108 and lower ring 116, which in this case is a male-female coupling arrangement of square blocks on the vertical members which are insertable into complementary square sockets in the upper ring 108 and the lower ring 116. Other structures and coupling arrangements for connecting the vertical supports 118 to the upper ring 108 and lower ring 116 may be provided and more than two rings or a single ring may be provided if it is determined that certain applications of the inventive sealing element require additional or less reinforcement in the upper portion of the elastomeric body. The coupling arrangements permit the frame 114 to be assembled efficiently without requiring any tools.

Figure 5D:
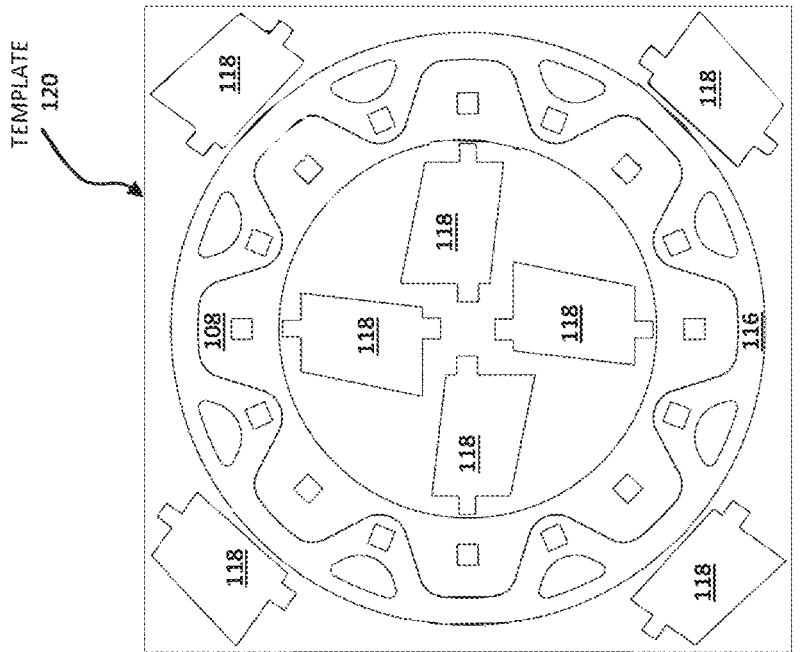
FIG. 5D is one embodiment of a template 120 used for cutting component parts of the frame 114 from a single sheet of sheet metal.

Advantageously, the upper ring 108, the lower ring 116 and the vertical members 118 are shaped such that they can be cut from a single sheet of sheet metal using a suitable template. Therefore, all components of the frame have the same thickness. An example of such a template is shown in FIG. 5D. This template 120 is provided to minimize wastage of sheet metal where the lines inside the square indicate where sheet metal cuts are to be made to form the upper ring 108, the lower ring 116 and the vertical members 118. In this template 120, 4 vertical members are cut near the corners of the sheet metal piece while the smaller diameter upper ring 108 is cut from the inside of the larger diameter lower ring 116 and four additional vertical members 118 are cut from the remaining metal inside the outer diameter of the upper ring 108. It is to be understood that in alternative embodiments, different templates may be provided in a similar manner to construct frames having different shapes from a single sheet of sheet metal in a similar manner.

Figures 6, 7A, 7B, 7C:
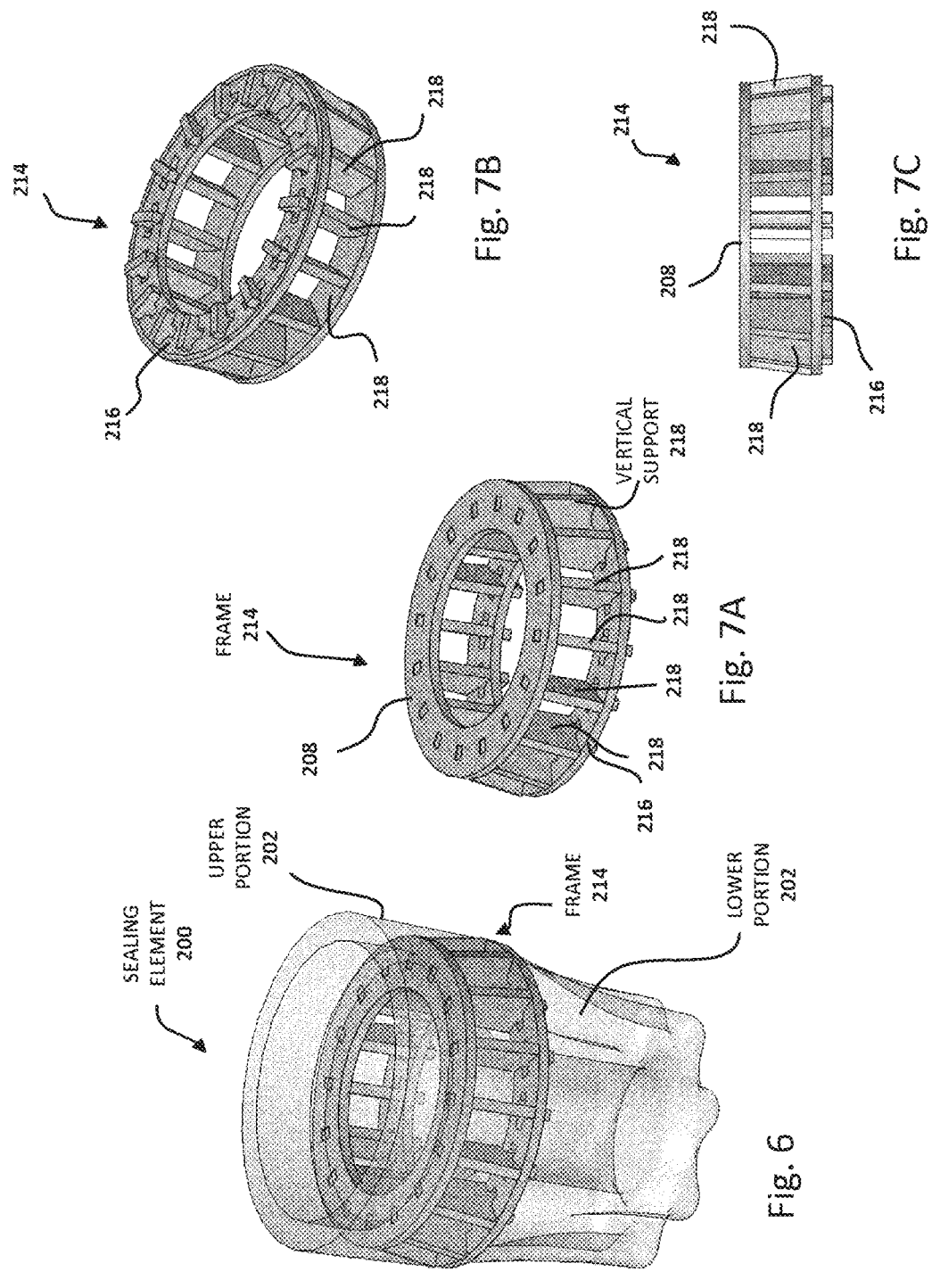
FIG. 6 is a perspective view of another sealing element embodiment 200 which shows the elastomeric body as transparent to visualize the frame 214 inside the upper portion 202.
FIG. 7A is a top perspective view of the frame 214 of the sealing element 200.
FIG. 7B is bottom perspective view of the frame 214 of the sealing element 200.
FIG. 7C is a side elevation view of the frame 214 of the sealing element 200.

Another sealing element embodiment 200 is shown in FIG. 6 and the frame 214 of this embodiment 200 is shown by itself in FIGS. 7A to 7C. FIG. 6 is a perspective view of this sealing element 200 with a transparent elastomeric body which is generally similar to the elastomeric body of sealing element 100 (see FIG. 4D) in having an upper portion 202 and a lower portion 204. The frame 214 of this embodiment 200 has wider rings 208, 216 without lobes and 16 vertical supports 218. As this frame includes more material providing additional rigidity, this embodiment may be preferred in certain applications of sealing elements requiring additional reinforcement of the elastomeric body. FIG. 7B indicates that each of the vertical supports 218 has a coupling arrangement based on a twist-lock mechanism at one of the connecting ends with a portion which fits into a complementary slot on the lower ring 216, which is then twisted to an orientation aligned with the diameter of the lower ring 216 to lock the vertical supports 218 in place on the lower ring 216.

Figures 8, 9A, 9B, 9C:
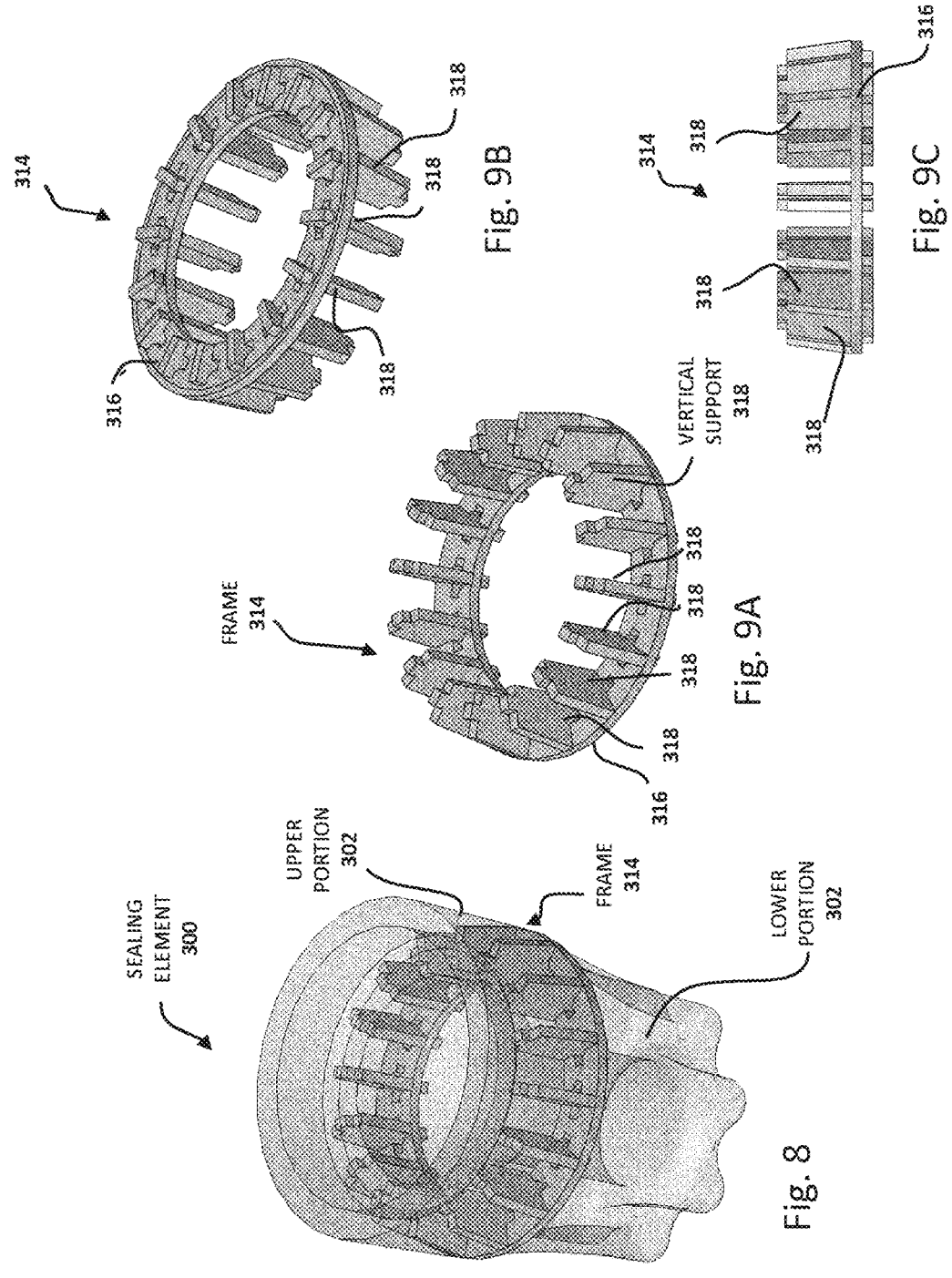
FIG. 8 is a perspective view of another sealing element embodiment 300 showing its elastomeric component as transparent to visualize the frame 314 inside the upper portion 302.
FIG. 9A is a top perspective view of another embodiment of a frame 314.
FIG. 9B is a bottom perspective view of frame 314 of FIG. 9A.
FIG. 9C is a side elevation view of the frame 314 of FIGS. 9A and 9B.

Another sealing element embodiment 300 is shown in FIG. 8 and the frame 214 of this embodiment 200 is shown by itself in FIGS. 9A to 9C. It is seen in FIGS. 8 and 9A to 9C that the frame 314 is similar to frame 216 of embodiment 200 in having a lower ring 316 and 16 vertical members 318 which lock to the lower ring 316 in a similar manner. However, a corresponding upper ring is omitted from the frame 314 in this embodiment 300. This sealing element embodiment 300 may be useful in applications where less internal support is required.

Figures 10A, 10B, 10C:
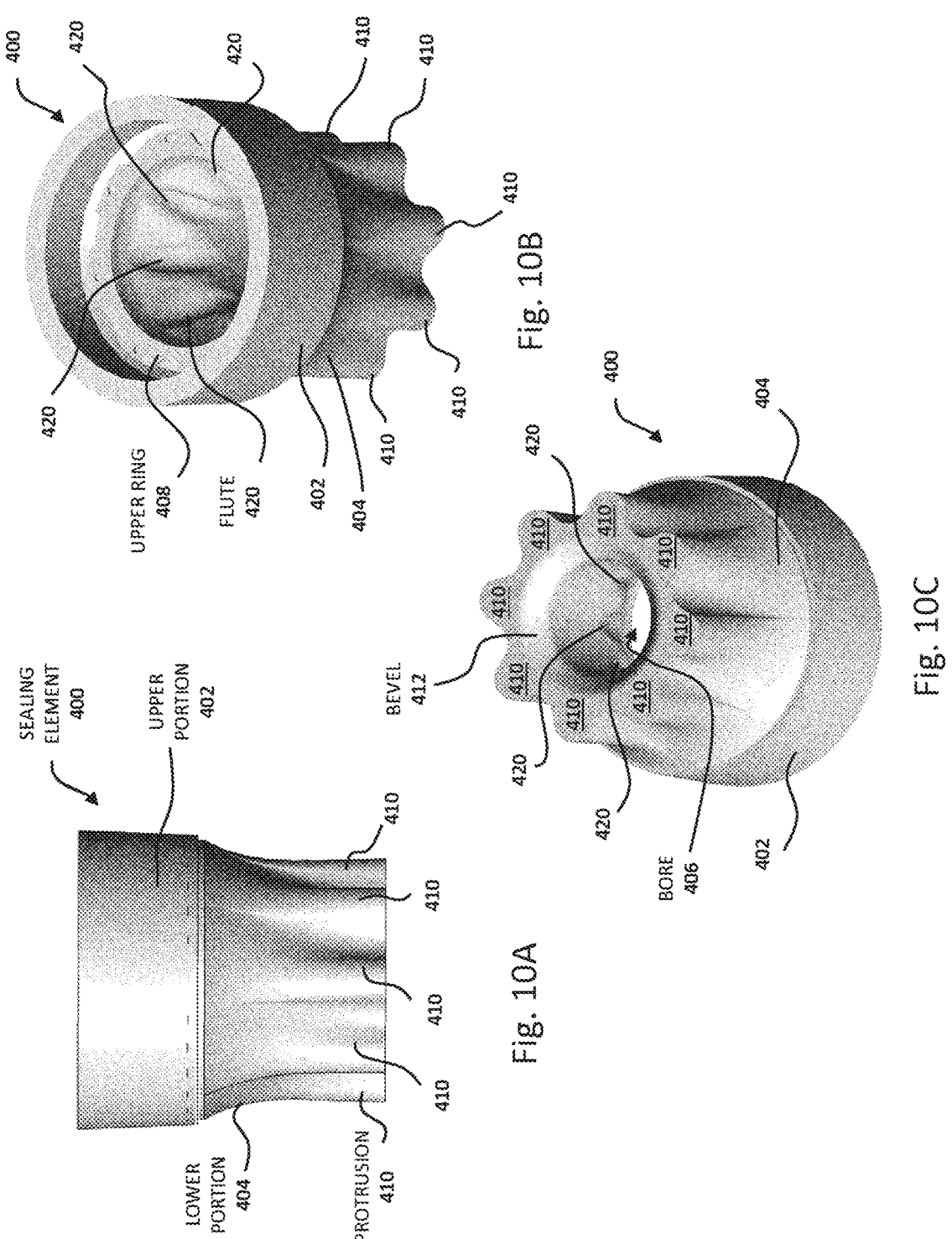
FIG. 10A is a side elevation view of another sealing element embodiment 400.
FIG. 10B is a top perspective view of sealing element 400.
FIG. 10C is a bottom perspective view of sealing element 400.

Another sealing element embodiment 400 is shown in FIGS. 10A to 10C. This embodiment 400 also has an upper portion 402 reinforced with a frame which is similar to frame 114 of embodiment 100 (only the upper ring 408 is visible in FIG. 10B) and a lower portion 404 with 8 protrusions 410. This embodiment 400 is modified relative to embodiment 400 in having a series of flutes 420 formed in the funnel-shaped portion of the bore 406, extending slightly into the lower cylindrical portion of the bore 406. These flutes 420 are best seen in FIGS. 10B and 10C. The flutes 420 are provided to enhance the vertical compression strength and flexibility while reducing frictional forces against the funnel-shaped portion of the sidewall of the bore 406 at the transition of the funnel-shaped portion to the lower cylindrical portion of the bore 406. The bottom of the sidewall of the bore 406 is provided with a bevel 412 as described for sealing element embodiment 100.

Figures 15, 16:
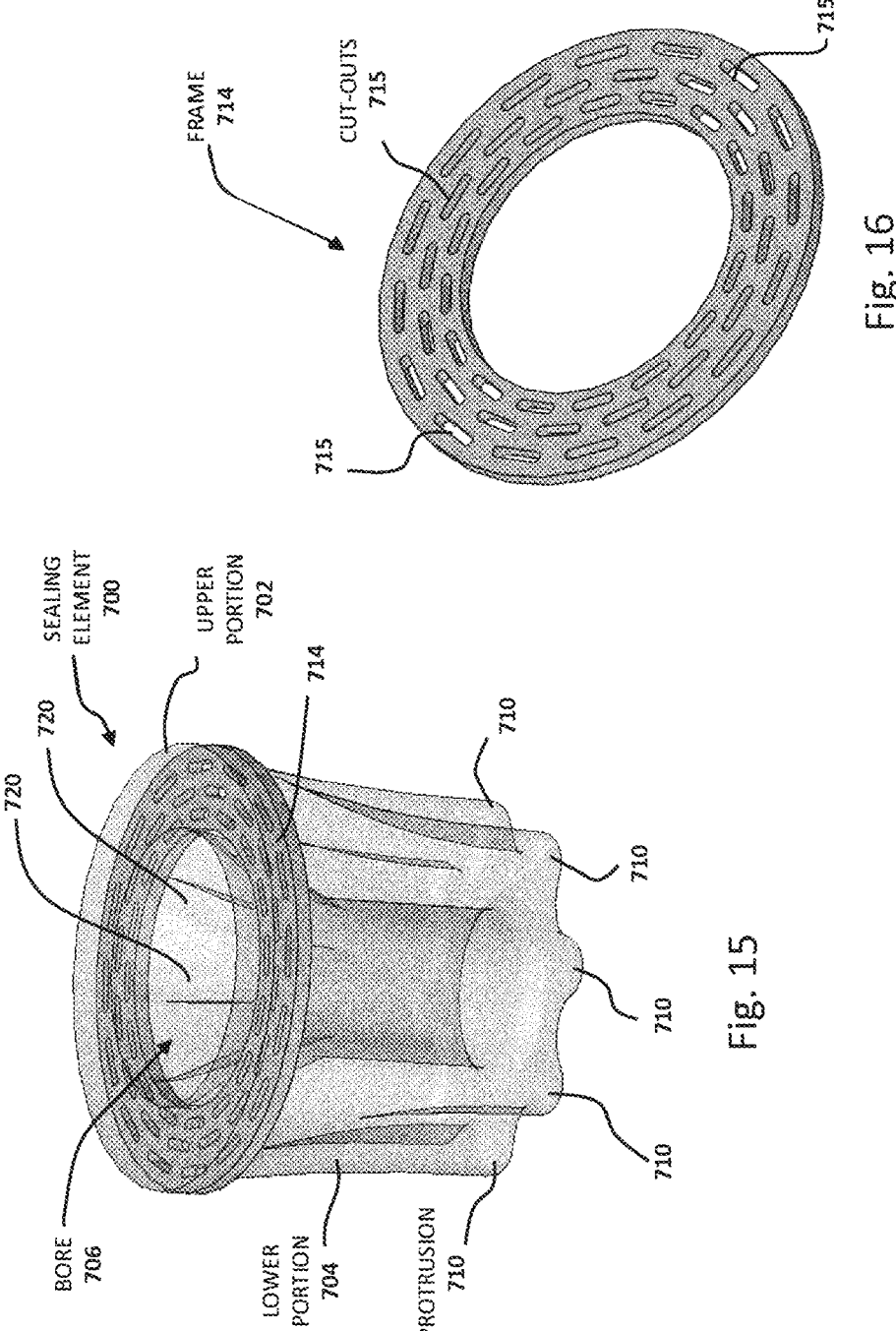
FIG. 15 is a side perspective view of another sealing element embodiment 700 showing its elastomeric body as transparent to visualize a reinforcing frame 714 inside the upper portion 702.
FIG. 16 is a perspective view of the reinforcing frame 714.

Another sealing element embodiment 700 is shown in FIG. 15 which includes a different embodiment of a frame 714 shown in FIG. 16. This particular sealing element embodiment 700 includes some features of previously described embodiments, such as an upper portion 702 and a lower portion 704 with 8 protrusions 710. However sealing element 700 differs in having an upper portion 702 which is significantly reduced in height relative to the upper portion of the previously described embodiments. Whereas sealing element embodiments 100, 200, 300, 400 and 500 each have an upper portion representing about 35% to about 45% of the total height of the sealing element, sealing element 700 has an upper portion 702 representing about 8% to about 12% of the total height of the sealing element. It is believed that the reduced height upper portion 702 provides sufficient thickness to support a single flat frame such as frame 714, formed in a ring shape and having a plurality of cut-outs 715 to mechanically assist in the adhesion of the elastomeric material to the frame 714 using an adhesive compatible with the bonding surfaces. The cut-outs 715 increase the surface area available for adhesion of the frame 714 to the elastomeric material. In addition, the cut-outs reduce the mass of the frame 714. While the cut-outs 715 of this sealing element embodiment 700 are rod-shaped with curved ends, alternative cut-outs may have alternative shapes. Sealing element 700 includes features shared by the previously described embodiments 100, 200, 300, 400 and 500, such as a bore 706 having flutes 720 and a lower portion 710 with protrusions 710. This sealing element embodiment 700 is configured for use with an alternative assembly described hereinbelow.

Embodiment of a Process for Manufacturing Sealing Elements

Advantageously in some embodiments, the structure of the entire elastomeric body, which includes various shapes, may be conveniently molded by casting or injection molding. Casting is a manufacturing process in which a liquid material is usually poured into a mold, which contains a hollow cavity of the desired shape, and then allowed to solidify. The solidified part is also known as a casting, which is ejected or broken out of the mold to complete the process. In general terms, casting materials are time-setting materials that cure after mixing two or more components together to provide a hardened material. Examples of casting materials are epoxy, concrete, plaster and clay. Casting or injection molding is most often used for making complex shapes that would be otherwise difficult or uneconomical to make by other methods.

With respect to the embodiments described herein, the casting or injecting process may include pouring or injecting liquid elastomer into a mold which contains a structure for holding the reinforcing frame in place such that the elastomeric body is formed with the reinforcing frame contained within the upper portion of the elastomeric body such that at least one part of the frame is located at the transition between the upper and lower portion. The mold may include an inner sidewall formed to generate the outer cylindrical profile of the upper portion of the elastomeric body and the pleated frustoconical profile with the radiused columnar protrusions of the lower portion of the elastomeric body, as well as an internal mold portion for forming the shapes associated with the bore, which may include the upper cylindrical sidewall which transitions to the funnel-shaped sidewall (optionally including flutes) and the lower reduced diameter cylindrical sidewall.

Figure 11:
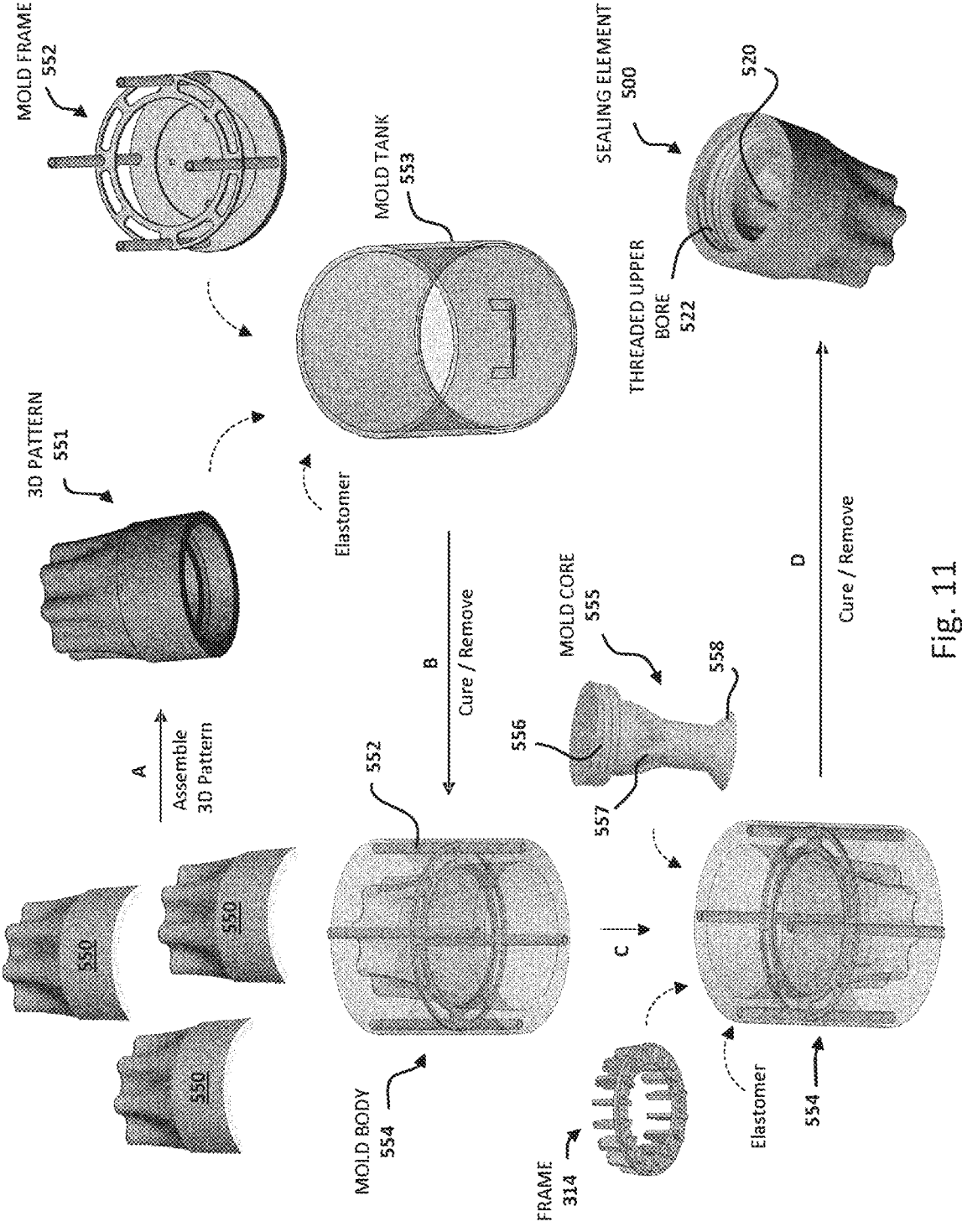
FIG. 11 is a scheme for construction of another sealing element embodiment 500 which has a threaded upper bore 522 and flutes 520.

As noted above, the inventors have recognized significant shortcomings relating to costs in producing molds for constructing sealing elements and have developed a process which is expected to lead to significant reduction in costs of manufacturing sealing elements while permitting significant additional prototype-based research to be conducted with an aim towards optimizing various structural features of sealing elements. An example embodiment of such a manufacturing process is illustrated in FIG. 11. The process begins with production of three pattern parts 550 by 3D printing using a benchtop scale 3D printer. While this particular embodiment has three printed pattern parts 550, in alternative embodiments the entire 3D pattern 551 may be printed in a single printer run from a larger 3D printer or there may be 2, or 4 or more printed pattern parts 550 which are assembled in step A to create the 3D pattern, for example by connecting them using an adhesive which is compatible with the printing plastic material being used.

It is to be understood that the 3D pattern generally represents a printed replica (typically printed from plastic material) which includes at least the shapes of the outer body of the sealing element to be formed (in some embodiments, the 3D pattern also includes the shapes associated with the central bore of the sealing element to be formed). Next, the 3D pattern 551 is placed in a mold tank 553 and a mold frame 552 is placed in the mold tank 553 such that it surrounds the 3D pattern 551. The mold frame includes four upright members, a centralizer ring and a base. Then an elastomer in liquid form is poured into the mold tank 553. In step B, the elastomer is cured to generate a mold body 554 formed of rigidly cured elastomer having an internal mold frame 552 providing additional support to the mold body 554, wherein the base of the mold frame forms an upper surface of the mold body 554 (in FIG. 11, the mold body 554 is shown as transparent to visualize the mold frame 552 inside the mold body 554). The pleated profile is seen at the top of the mold body 554 in the orientation it is in when it is removed from the mold tank 553. In step C, the mold body 554 is turned upside down to facilitate subsequent operations and a frame 314 is placed and supported inside the mold body 554. Then a mold core 555 is placed inside the ring of the frame 314 (alternative frames with different support features may be used in alternative embodiments). In some embodiments, the mold core 550 is a 3D-printed component. In other embodiments the mold core 555 is itself a molded part formed from casting an elastomer into the central bore of a 3D pattern having the desired shapes for the mold core 555. In FIG. 11, it is seen that the mold core 555 is defined by an upper cap 556 having a threaded outer sidewall, an intermediate inwardly tapered portion defined by radial ribs 557 and a lower outwardly tapered portion 558. When the frame 314 and mold core 555 are placed in the mold body 554 to provide a complete mold assembly, a liquid elastomer is poured into the spaces between the mold body 554 and the mold core 555 to fill all the spaces within this mold assembly prior to curing in step D. The shape of the inner sidewall of the mold body 554 forms the shaped outer sidewall of the resulting sealing element 500. The threaded outer sidewall of the cap 556 of the mold core 555 forms the threaded upper bore 522 of the sealing element 500 and the ribs 557 of the mold core 555 form the flutes 520 of the sealing element 500. While not visible in FIG. 11, it is to be understood that the outwardly tapered lower portion 558 of the mold core 555 forms the lower end of the bore with an inward bevel similar to the bevel 412 of sealing element embodiment 400 shown in FIG. 10C. It is to be recognized that in alternative embodiments, this inventive process may be adapted for use with injection molding processes without undue experimentation.

This embodiment of a manufacturing process indicates that molds can be relatively inexpensively prepared from 3D-printed sealing element patterns or portions thereof, in order to avoid the expensive process of machining a mold assembly from aluminum or other metallic materials. The cost savings will permit additional prototyping to be performed in efforts to optimize the balance between strength and flexibility of sealing elements having features similar to the features described herein, as well as other additional features which may be recognized as having the potential to contribute to sealing elements having enhanced properties.

A First Embodiment of a Sealing Element Assembly

Figure 12B:
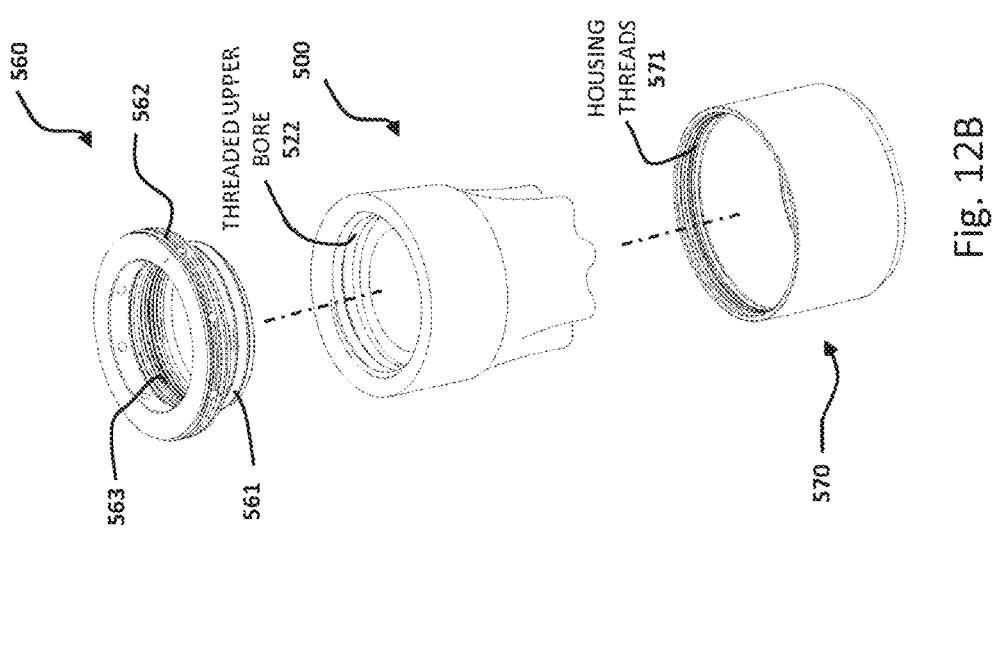
FIG. 12B is an exploded view of an assembly including sealing element 500, adapter 560 and adapter housing 570.
Figure 12A:
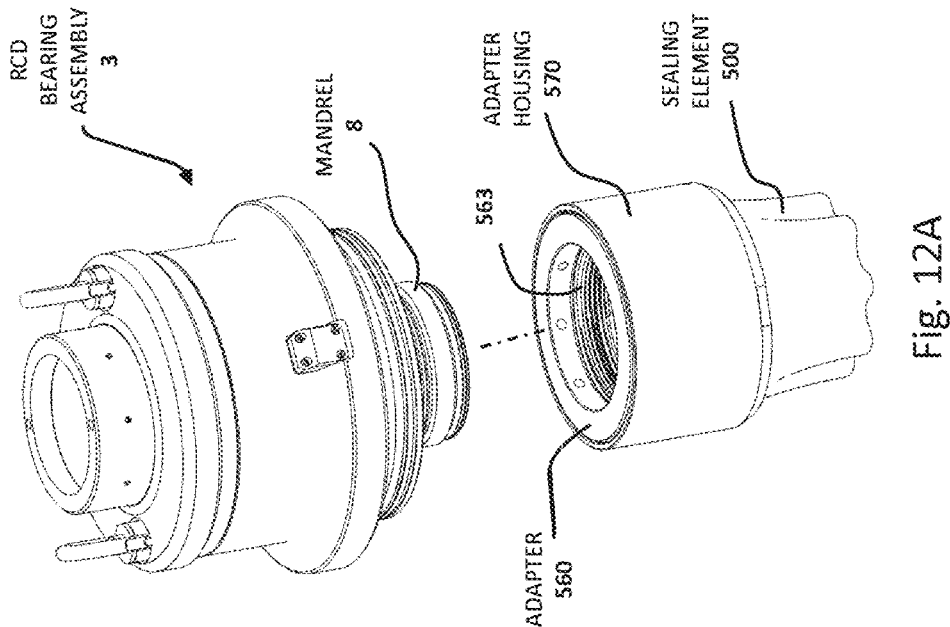
FIG. 12A is a partially exploded view of an arrangement for connecting sealing element 500 to an RCD bearing assembly 3.

A first embodiment of a sealing element assembly is shown in FIGS. 12A and 12B. FIG. 12A indicates the manner of connecting a sealing element assembly constructed of sealing element 500, an adapter 560 and an adapter housing 570 to the mandrel 8 extending downwardly from an RCD bearing assembly 3. It is seen that the adapter 560 has internal threads 563 configured to connect to threads of the mandrel 8. The exploded view of FIG. 12B shows that the adapter 560 has a lower reduced diameter portion with threads 561 configured to mate with the threads 522 of the sealing element 500. The adapter housing 570 is provided to protect the adapter 560 and is installed from the bottom of the sealing element with threading of the housing threads 571 to upper outer threads 562 of the adapter 560 after the sealing element 500 and the adapter 560 are connected to each other.

This arrangement permits the sealing element assembly to be conveniently disassembled to enable operators to assess the integrity of the sealing element 500. If it is found that the sealing element 500 is damaged, it can be discarded or recycled and a replacement sealing element 500 can be used to construct the assembly in a convenient fashion.

While this example describes a sealing element assembly which includes sealing element 500, other embodiments of sealing elements and adapters may be used in a similar manner provided that a suitable coupling structure is provided to connect the alternative sealing element to the alternative adapter, such as a hinged and/or bolted outer clamp, for example. Such a clamp may be configured to couple to suitable coupling structures such as a lip or groove on a cylindrical portion of the sealing element and a lip or groove provided on an adapter configured to connect to the mandrel or a lip or groove provided on the mandrel itself.

The sealing element embodiments described herein are arranged to provide functionality consistent with maintaining their position axially and radially while providing convenient coupling and sealing to the mandrel of the bearing assembly of the rotating control device without a need for o-rings, as required by conventional sealing elements.

Sealing Element Assembly Embodiment with a Split Retaining Ring

Figures 13A, 13B, 13C:
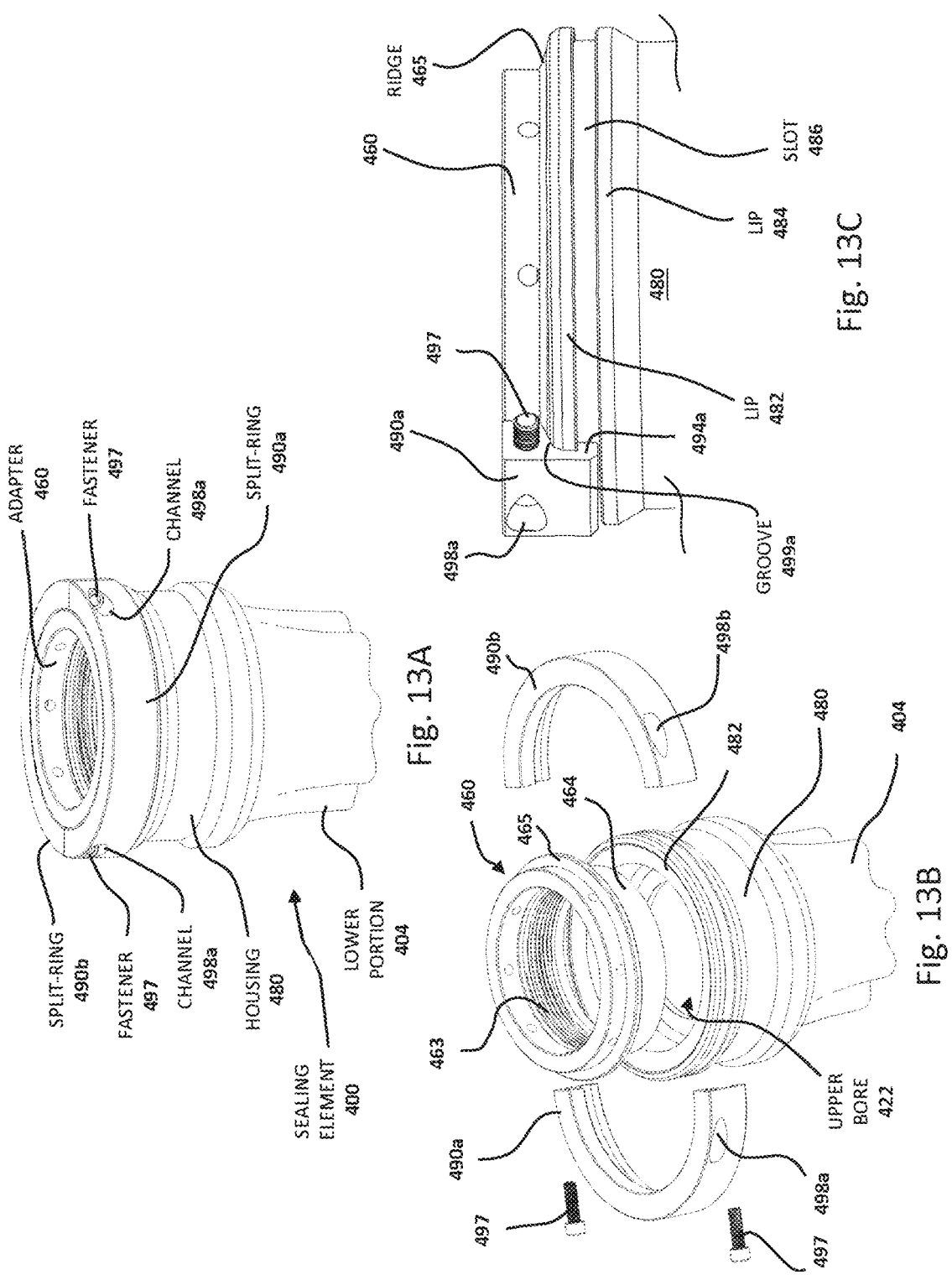
FIG. 13A is a perspective view of a sealing element assembly embodiment based on sealing element 400, housing 480, adapter 460 and split retention ring halves 490*a,b*.
FIG. 13B is an exploded perspective view of the assembly embodiment of FIG. 13A.
FIG. 13C is a view of an upper portion of the assembly embodiment of FIGS. 13A and 13B indicating detail for the mechanism of connecting the split retention ring halves 490*a,b* to the adapter 460 and housing 480.

Referring now to FIGS. 13A to 13C, there is shown another embodiment of a sealing element assembly based on previously described sealing element 400 in combination with a housing 480 which is configured to fit onto the upper portion 402 of the sealing element 400 by sliding the housing 480 upward from the bottom end of the sealing element 400 such that, when the housing 480 is installed, only the lower portion 404 of the sealing element 400 is visible (FIG. 13A).

An adapter 460 (see exploded view of FIG. 13B) is included for making a connection to a mandrel of a rotating control device (not shown). The adapter 460 has some features similar to the features of adapter 560 shown in FIG. 12B but does not have a lower threaded portion similar to the threaded portion 561 of adapter 560 because the sealing element 400 does not have an upper threaded bore. The adapter 460 has a lower portion 464 which fits into the upper bore 422 of the sealing element 400. The adapter 460 is installed following installation of the housing 480 as described above such that a circumferential tapered ridge 465 of the adapter 460 rests upon an upper surface of an upper lip of the housing 480.

The adapter 460 is held in within the upper bore 422 by a split retaining ring formed of two ring halves 490*a,b*. Each ring half 490*a,b* has a pair of channels 498*a,b* for receiving fasteners 497 to connect the ring halves 490*a,b* to each other.

As shown in FIG. 13C, the adapter 460 and housing 480 are provided with coupling structures to facilitate connecting the adapter 465 to the housing 480 using the ring halves 490*a,b*. The upper lip 482 of the housing 480 and a lower lip 484 define a slot 486. In FIG. 13C, ring half 490*a* is shown connecting the adapter 460 to the housing 480. The tapered ridge 465 of the adapter 460 cooperates with a tapered groove 499*a* in the cross-sectional profile of the ring half 490*a* to facilitate connecting the ring half 490*a* to the adapter 460 and housing 480. The tapered groove 499*a* terminates at a rectangular rail portion 494*a* which is complementary with the slot 486. To make the connection of the ring half 490*a* to the adapter 460 and housing 480, the rail portion 494*a* is partially inserted into the slot 486 and then the ring half 490*a* is pushed along the ridge 465 of the adapter with the surface of its tapered groove 499*a* sliding along the tapered ridge 465 until the rail portion 494*a* snaps completely into the slot 486. The process is then repeated for the other ring half 490*b* and then the fasteners 497 are connected for reversible connection of the ring halves 490*a,b* to the adapter 465 and the housing 480. In this embodiment, the pressure exerted by the ring halves 490*a,b* is sufficient to hold the housing 480 in place against the outer sidewall of the upper portion of the sealing element 400.

Figures 14A, 14B:
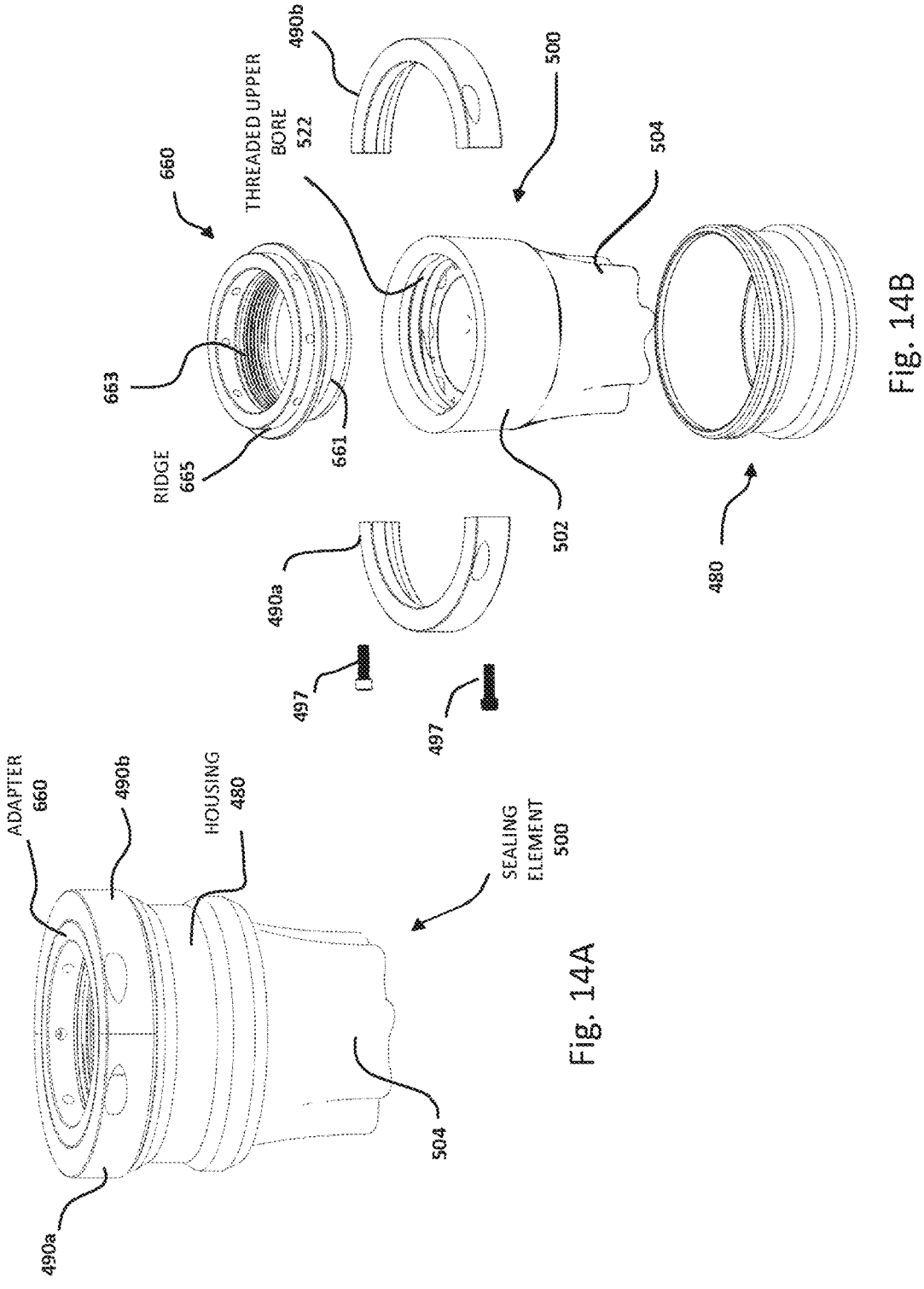
FIG. 14A is a perspective view of a sealing element assembly embodiment based on sealing element 500, housing 480, adapter 660 and split retention ring halves 490*a,b*.
FIG. 14B is an exploded perspective view of the assembly embodiment of FIG. 14A.

In some applications where retention of the housing 480 against the sealing element 400 using the ring halves may not be sufficiently strong, it may be advantageous to instead employ a sealing element with an upper threaded bore such as sealing element 500 which can be combined with an adapter having lower outer threads. This arrangement is shown in FIGS. 14A and 14B where it is seen that the housing 480 and ring halves 490*a,b* can are compatible with another arrangement which uses a different adapter 660 and sealing element 500. The adapter 660 has similar features as adapter 460, including a tapered ridge 665 and inner threads 663 for connection to a mandrel of a rotating control device (not shown). This adapter 660 is provided with outer threads 661 configured for connection to inner threads of the threaded upper bore 522 of sealing element 500. Other than the threading of the adapter 660 to the threaded inner bore 522 of sealing element 500, the assembly is identical to the assembly shown in FIGS. 13A to 13C. It is believed that threading of an adapter to a sealing element as described in FIGS. 14A and 14B will provide an improved connection between the adapter and the sealing element and may therefore be useful in applications where relatively high downhole pressures are involved. The threads add resistance to rotational torque, substantially preventing spinning within the adapter. The threads also allow the element to be more easily removed from the adapter by unthreading.

Second Sealing Element Assembly Embodiment with a Split Retaining Ring

Figures 17A, 17B, 17C:
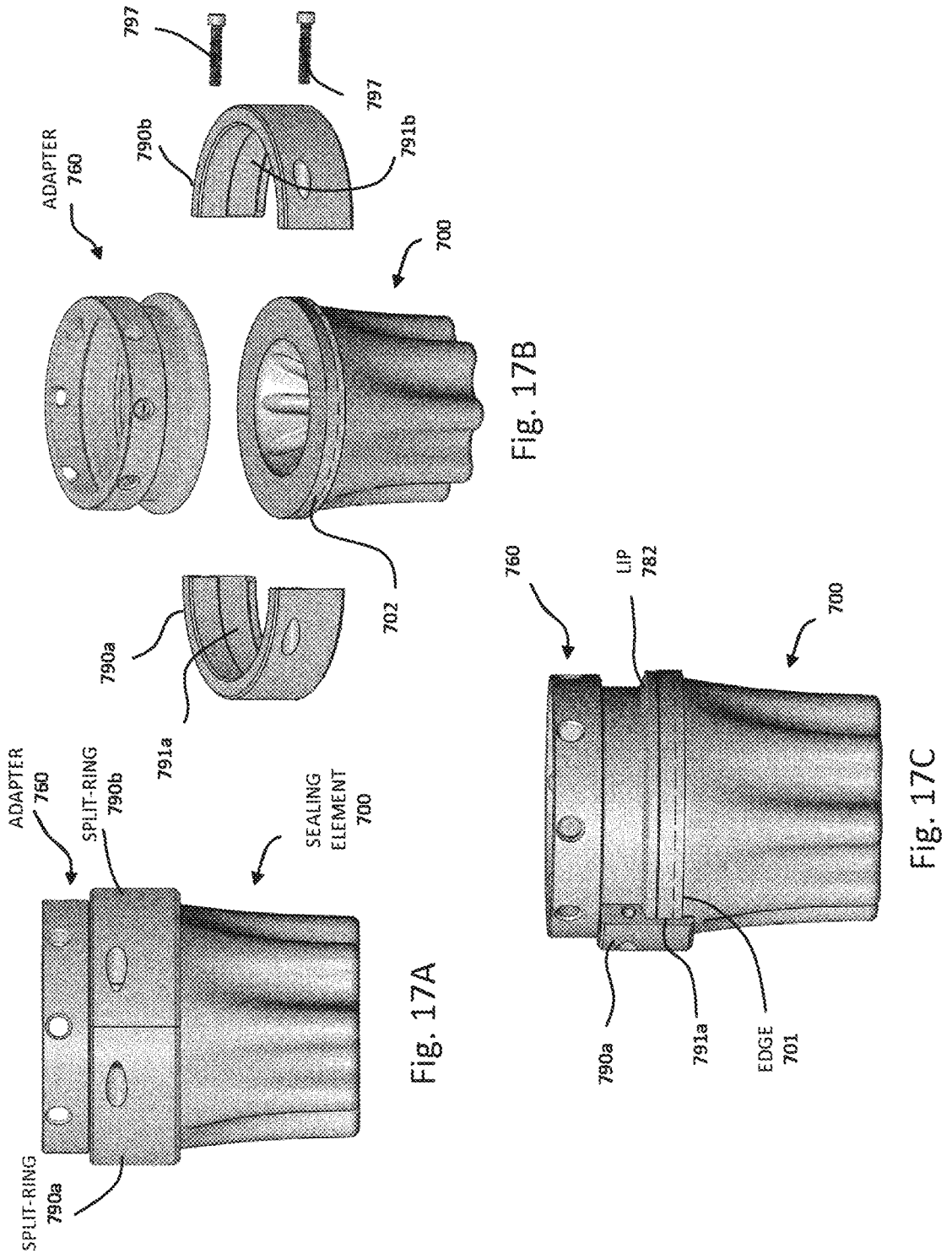
FIG. 17A is a side elevation view of a sealing element assembly including sealing element 700.
FIG. 17B is an exploded view of the sealing element assembly of FIG. 17A.
FIG. 17C is a side elevation view of the sealing element assembly of FIGS. 17A and 17B showing one ring half 790*a* in cross section.

Turning now to FIGS. 17A to 17C, there is shown another sealing assembly embodiment developed for sealing element embodiment 700 described hereinabove. This assembly includes an adapter 760 configured for direct connection to the upper portion 702 of the sealing element 700 using a split ring formed of ring halves 790*a,b* which are connected by fasteners 797 as indicated in the exploded view of FIG. 17B. The ring halves 790*a,b* each have an inner circumferential groove 791*a,b*. This assembly embodiment is provided with coupling structures formed on the adapter and the sealing element 700 itself. It is seen in FIG. 17C that the split ring 790*a* is configured to retain a lip 782 of the adapter 760 against the lower edge 701 of the upper portion 702 of the sealing element 700. The circumferential groove 791*a,b* of the split retaining ring holds the lower edge 701 of the upper portion 702 of the sealing element 700 against the lower surface of the adapter 760.

It can be seen that this sealing element assembly has fewer parts than the previously described sealing element assemblies (for example, a separate housing such as housing 480 is not required), thereby simplifying the construction of the component parts and reducing the cost of the assembly.

Advantages

It is to be understood that the sealing element components of the assembly embodiments described herein are consumable components while the housing, the adapter and the retaining ring are reusable. Therefore, if a sealing element is damaged due to normal wear, the assembly may be conveniently disassembled into its component parts and the sealing element may be discarded because it is formed of inexpensive elastomer and an inexpensive internal frame constructed from a single piece of sheet metal. This construction provides the sealing element with sufficient strength to permit reliable connection of the outer housing, adapter and retaining ring which are reusable and compatible with sealing elements having other features. The assembly therefore enables operators to dispense with refurbishing of damaged sealing elements, as conventionally required.

Equivalents and Scope

The terms "one," "a," or "an" as used herein are intended to include "at least one" or "one or more," unless otherwise indicated.

Any patent, publication, internet site, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Unless otherwise defined, all technical and scientific terms used herein have the same meaning as commonly understood by one of ordinary skill in the art.

While the technology has been particularly shown and described with references to embodiments thereof, it will be understood by those skilled in the art that various changes in form and details may be made therein without departing from the scope of the invention encompassed by the appended claims.

The invention claimed is:

1. A process for manufacturing a sealing element for use with a rotating control device, the process comprising:

providing a three-dimensional mold pattern of the sealing element, the mold pattern defined by a shaped outer pattern sidewall;

casting or injecting a first elastomer over the three-dimensional pattern and curing the first elastomer to produce a mold body having a shaped inner mold sidewall complementary to the shaped outer pattern sidewall;

placing a frame and a core inside the mold body, the frame held in place by the shaped inner mold sidewall and the core provided with a shaped outer core sidewall;

casting or injecting a second elastomer into the mold body and curing the second elastomer to produce the sealing element, wherein the sealing element is defined by a shaped outer sealing element sidewall complementary to the shaped inner mold sidewall and a central bore defined by a shaped inner sealing element sidewall complementary to the shaped outer core sidewall.

2. The process of claim 1, wherein the mold pattern is produced by additive manufacturing.

3. The process of claim 1, wherein the mold pattern is assembled from two or more three-dimensional pattern parts.

4. The process of claim 1, wherein the frame comprises at least one ring circumscribing the central bore.

5. The process of claim 1, wherein the frame is formed of a metal or alloy.

6. The process of claim 5, wherein the frame is formed of one or more parts cut from a single piece of sheet metal or alloy.

7. The process of claim 1, wherein the shaped outer sealing element sidewall includes a plurality of outer protrusions providing columnar support to a lower portion of the sealing element against forces exerted against the lower portion by a drill string passing through the central bore.

8. The process of claim 1, wherein the shaped inner sealing element sidewall is provided with a coupling structure for connecting the sealing element to a rotating control device.

9. The process of claim 1, wherein the shaped outer sealing element sidewall is provided with an outer lip or groove configured to couple to a separate clamp which also clamps directly or indirectly to a component of the rotating control device.

10. The process of claim 1, wherein the shaped inner sealing element sidewall includes a plurality of flutes.

11. The process of claim 1, wherein the mold pattern is not constructed by machining.

12. The process of claim 2, wherein the mold pattern is assembled from two or more three-dimensional pattern parts.

13. The process of claim 12, wherein the frame comprises at least one ring circumscribing the central bore.

14. The process of claim 13, wherein the frame is formed of a metal or alloy.

15. The process of claim 14, wherein the frame is formed of one or more parts cut from a single piece of sheet metal or alloy.

16. The process of claim 15, wherein the shaped outer sealing element sidewall includes a plurality of outer protrusions providing columnar support to a lower portion of the sealing element against forces exerted against the lower portion by a drill string passing through the central bore.

17. The process of claim 16, wherein the shaped inner sealing element sidewall is provided with a coupling structure for connecting the sealing element to a rotating control device.

18. The process of claim 17, wherein the shaped outer sealing element sidewall is provided with an outer lip or groove configured to couple to a separate clamp which also clamps directly or indirectly to a component of the rotating control device.

19. The process of claim 18, wherein the shaped inner sealing element sidewall includes a plurality of flutes.

* * * * *